(12) United States Patent
Huang et al.

(10) Patent No.: US 12,525,233 B2
(45) Date of Patent: Jan. 13, 2026

(54) JOINT SEGMENTING AND AUTOMATIC SPEECH RECOGNITION

(71) Applicant: Google LLC, Mountain View, CA (US)

(72) Inventors: Ronny Huang, Mountain View, CA (US); Shuo-yiin Chang, Sunnyvale, CA (US); David Rybach, Munich (DE); Rohit Prakash Prabhavalkar, Palo Alto, CA (US); Tara N. Sainath, Jersey City, NJ (US); Cyril Allauzen, Mountain View, CA (US); Charles Caleb Peyser, New York, NY (US); Zhiyun Lu, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 319 days.

(21) Appl. No.: 18/304,064

(22) Filed: Apr. 20, 2023

(65) Prior Publication Data
US 2023/0343332 A1 Oct. 26, 2023

Related U.S. Application Data

(60) Provisional application No. 63/363,383, filed on Apr. 21, 2022.

(51) Int. Cl.
*G10L 15/04* (2013.01)
*G10L 15/02* (2006.01)
(Continued)

(52) U.S. Cl.
CPC ............ *G10L 15/197* (2013.01); *G10L 15/02* (2013.01); *G10L 15/04* (2013.01); *G10L 15/063* (2013.01);
(Continued)

(58) Field of Classification Search
CPC ....... G10L 15/197; G10L 15/02; G10L 15/04; G10L 15/063; G10L 15/22; G10L 25/93;
(Continued)

(56) References Cited

U.S. PATENT DOCUMENTS 12,002,451 B1 * 6/2024 Liu .................... G10L 15/16
12,211,517 B1 * 1/2025 Maas .................. G10L 15/26
(Continued)

FOREIGN PATENT DOCUMENTS

JP 2019204073 A 11/2019
WO 2021113443 A1 6/2021

OTHER PUBLICATIONS

Li et al., Towards Fast and Accurate Streaming End-to-end ASR, 2020, arXiv:2004.11544v2 (Year: 2020).*
(Continued)

*Primary Examiner* — Pierre Louis Desir
*Assistant Examiner* — Cody Douglas Hutcheson
(74) *Attorney, Agent, or Firm* — Honigman LLP; Brett A. Krueger; Grant Griffith

(57) ABSTRACT

A joint segmenting and ASR model includes an encoder and decoder. The encoder configured to: receive a sequence of acoustic frames characterizing one or more utterances; and generate, at each output step, a higher order feature representation for a corresponding acoustic frame. The decoder configured to: receive the higher order feature representation and generate, at each output step: a probability distribution over possible speech recognition hypotheses, and an indication of whether the corresponding output step corresponds to an end of speech segment. The joint segmenting and ASR model trained on a set of training samples, each training sample including: audio data characterizing a spoken utterance; and a corresponding transcription of the spoken utterance, the corresponding transcription having an end of
(Continued)

speech segment ground truth token inserted into the corresponding transcription automatically based on a set of heuristic-based rules and exceptions applied to the training sample.

20 Claims, 5 Drawing Sheets

(51) Int. Cl.
    *G10L 15/06*     (2013.01)
    *G10L 15/197*     (2013.01)
    *G10L 15/22*     (2006.01)
    *G10L 25/93*     (2013.01)
    *H04N 19/117*     (2014.01)
    *H04N 19/159*     (2014.01)
    *H04N 19/172*     (2014.01)
    *H04N 19/80*     (2014.01)

(52) U.S. Cl.
    CPC .............. *G10L 15/22* (2013.01); *G10L 25/93* (2013.01); *H04N 19/117* (2014.11); *H04N 19/159* (2014.11); *H04N 19/172* (2014.11); *H04N 19/80* (2014.11); *G10L 2015/025* (2013.01); *G10L 2025/932* (2013.01)

(58) Field of Classification Search
    CPC ......... G10L 2015/025; G10L 2025/932; G10L 15/16; G06N 3/0455; G06N 3/09
    See application file for complete search history.

(56) References Cited

U.S. PATENT DOCUMENTS

2020/0335091 A1* 10/2020 Chang .................... G10L 15/14
2022/0199091 A1* 6/2022 Kanda .................... G10L 15/16
2024/0346374 A1* 10/2024 Ni .......................... G16H 50/70

OTHER PUBLICATIONS

Xu et al., LRSpeech: Extremely Low-Resource Speech Synthesis and Recognition, 2020, arXiv:2008.03687v1 (Year: 2020).*
Variani et al., Hybrid Autoregressive Transducer (HAT), 2020, arXiv:2003.07705v1 (Year: 2020).*
Narayanan et al., Cascaded Encoders for Unifying Streaming and Non-streaming ASR, 2020, arXiv:2010.14606v1 (Year: 2020).*
International Search Report and Written Opinion for the related Application No. PCT/US2023/019318, dated Sep. 18, 2023, 18 pages.
Ronny Hoang et al: "E2E Segmenter: Joint Segmenting and Decoding for Long-Form ASR", arxiv.org, Cornell University Library, 201 Olin Library Cornell University Ithaca, NY 14853, Apr. 22, 2022 (Apr. 22, 2022), XP091208272, the whole document, 5 pages.
Japanese Office Action for the related Application No. 2024-561902 dated Jul. 15, 2025.

* cited by examiner

JOINT SEGMENTING AND AUTOMATIC SPEECH RECOGNITION

CROSS REFERENCE TO RELATED APPLICATIONS

This U.S. Patent Applications claims priority under 35 U.S.C. § 119(e) to U.S. Provisional Application 63/363,383, filed on Apr. 21, 2022. The disclosure of this prior application is considered part of the disclosure of this application and is hereby incorporated herein by reference in its entirety.

TECHNICAL FIELD

This disclosure relates to speech segmenting and automatic speech recognition.

BACKGROUND

Modern automatic speech recognition (ASR) systems focus on providing not only high quality (e.g., a low word error rate), but also low latency (e.g., a short delay between the user speaking and a transcription appearing). For example, when using a device that implements an ASR system today, there is often an expectation that the ASR system decodes utterances in a streaming fashion that corresponds to real-time or even faster than real-time.

SUMMARY

One aspect of the disclosure provides a joint segmenting and automatic speech recognition (ASR) model including an encoder and a decoder. The encoder configured to receive, as input, a sequence of acoustic frames characterizing one or more utterances, and generate, at each of a plurality of output steps, a higher order feature representation for a corresponding acoustic frame in the sequence of acoustic frames. The decoder configured to receive, as input, the higher order feature representation generated by the encoder at each of the plurality of output steps, and generate, at each of the plurality of output steps: a probability distribution over possible speech recognition hypotheses; and an indication of whether the corresponding output step corresponds to an end of speech segment. The joint segmenting and ASR model trained on a set of training samples, each training sample in the set of training samples includes: audio data characterizing a spoken utterance; and a corresponding transcription of the spoken utterance, the corresponding transcription having an end of speech segment ground truth token inserted into the corresponding transcription automatically based on a set of heuristic-based rules and exceptions applied to the training sample.

Implementations of the disclosure may include one or more of the following optional features. In some implementations, the decoder includes a prediction network, a first joint network, and a second joint network. The prediction network configured to, at each of the plurality of output steps receive, as input, a sequence of non-blank symbols output by a final softmax layer, and generate a hidden representation. The first joint network configured to: receive, as input, the hidden representation generated by the prediction network at each of the plurality of output steps and the higher order feature representation generated by the encoder at each of the plurality of output steps; and generate, at each of the plurality of output steps, the indication of whether the corresponding output step corresponds to an end of speech segment. The second joint network configured to: receive, as input, the hidden representation generated by the prediction network at each of the plurality of output steps and the higher order feature representation generated by the encoder at each of the plurality of output steps; and generate, at each of the plurality of output steps, the probability distribution over possible speech recognition hypotheses.

In some examples, at each of the plurality of output steps, the sequence of previous non-blank symbols received as input at the prediction network includes a sequence of N previous non-blank symbols output by the final softmax layer. Here, the prediction network is configured to generate the hidden representation by, for each non-blank symbol of the sequence of N previous non-blank symbols, generating a respective embedding, and generating an average embedding by averaging the respective embeddings, the average embedding including the hidden representation. In some examples, the prediction network includes a V2 embedding look-up table. In some implementations, a training process trains the joint segmenting and ASR model on the set of training samples by training, during a first stage, the second joint network to learn how to predict the corresponding transcription of the spoken utterance characterized by the audio data of each training sample; and, after training the second joint network, during a second stage initializing, the first joint network with the same parameters as the trained second joint network, and using the end of speech segment ground truth token inserted into the corresponding transcription of the spoken utterance characterized by the audio data of each training sample.

In some implementations, the encoder includes a causal encoder including a stack of conformer layers or transformer layers. In some examples, the end of speech segment ground truth token is inserted into the corresponding transcription automatically without any human annotation.

In some examples, the set of heuristic-based rules and exceptions applied to each training sample in the set of training samples includes inserting the ground truth end of speech segment token at the end of the corresponding transcription, and inserting the ground truth end of speech segment token into the corresponding transcription at a location aligned with a non-speech segment of the audio data having a duration that satisfies a threshold duration unless the non-speech segment of the audio data follows a word in the spoken utterance that is identified as a lengthened word or the non-speech segment of the audio data follows a word in the spoken utterance that is identified as a filler word. In some implementations, the word in the spoken utterance is identified as the lengthened word when a phoneme duration of the word satisfy a standard deviation threshold. In some examples, after training the joint segmenting and ASR model, the decoder is configured to emit the indication that the corresponding output step corresponds to the end of speech segment sooner than identifying a number of consecutive non-speech acoustic frames in the sequence of acoustic frames that satisfy the threshold duration. In some implementations, the joint segmenting and ASR model is trained to maximize a probability of emitting the end of speech segment ground truth label.

Another aspect of the disclosure provides a computer-implemented method executed on data processing hardware that causes the data processing hardware to perform operations including receiving a sequence of acoustic frames characterizing one or more utterances and, at each of a plurality of output steps: generating, by an encoder of a joint segmenting and automated speech recognition (ASR) model, a higher order feature representation for a corresponding acoustic frame in the sequence of acoustic frames;

and generating, by a decoder of the joint segmenting and ASR model a probability distribution over possible speech recognition hypotheses, and an indication of whether the corresponding output step corresponds to an end of speech segment. The joint segmenting and ASR model trained on a set of training samples, each training sample in the set of training samples including audio data characterizing a spoken utterance, and a corresponding transcription of the spoken utterance, the corresponding transcription having an end of speech segment ground truth token inserted into the corresponding transcription automatically based on a set of heuristic-based rules and exceptions applied to the training sample.

Implementations of the disclosure may include one or more of the following optional features. In some implementations, the operations also include, at each of the plurality of output steps, generating, using a prediction network of the decoder, a hidden representation based on a sequence of non-blank symbols output by a final softmax layer; generating the indication of whether the corresponding output step corresponds to the end of speech segment includes generating, using a first joint network of the decoder, the indication of whether the corresponding output step corresponds to the end of speech segment based on the hidden representation generated by the prediction network at each of the plurality of output steps and the higher order feature representation generated by the encoder at each of the plurality of output steps; and generating the probability distribution over possible speech recognition hypotheses includes generating, using a second joint network of the decoder, the probability distribution over possible speech recognition hypothesis based on the hidden representation generated by the prediction network at each of the plurality of output steps and the higher order feature representation generated by the encoder at each of the plurality of output steps.

In some examples, the sequence of previous non-blank symbols received as input at the prediction network includes a sequence of N previous non-blank symbols output by the final softmax layer; and generating the hidden representation using the prediction network includes generating the hidden representation by, for each non-blank symbol of the sequence of N previous non-blank symbols, generating a respective embedding, and generating an average embedding by averaging the respective embeddings, the average embedding includes the hidden representation. In some implementations, the prediction network includes a V2 embedding look-up table. In some examples, a training process trains the joint segmenting and ASR model on the set of training samples by: training, during a first stage, the second joint network to learn how to predict the corresponding transcription of the spoken utterance characterized by the audio data of each training sample; and, after training the second joint network, during a second stage: initializing, the first joint network with the same parameters as the trained second joint network; and using the end of speech segment ground truth token inserted into the corresponding transcription of the spoken utterance characterized by the audio data of each training sample.

In some implementations, the encoder includes a causal encoder including a stack of conformer layers or transformer layers. In some examples, the end of speech segment ground truth token is inserted into the corresponding transcription automatically without any human annotation. In some implementations, the set of heuristic-based rules and exceptions applied to each training sample in the set of training samples includes: inserting the ground truth end of speech segment token at the end of the corresponding transcription; and inserting the ground truth end of speech segment token into the corresponding transcription at a location aligned with a non-speech segment of the audio data having a duration that satisfies a threshold duration unless the non-speech segment of the audio data follows a word in the spoken utterance that is identified as a lengthened word, or the non-speech segment of the audio data follows a word in the spoken utterance that is identified as a filler word. In some examples, the word in the spoken utterance is identified as the lengthened word when a phoneme duration of the word satisfy a standard deviation threshold. In some implementations, after training the joint segmenting and ASR model, the operations also include emitting, by the decoder, the indication that the corresponding output step corresponds to the end of speech segment sooner than identifying a number of consecutive non-speech acoustic frames in the sequence of acoustic frames that satisfy the threshold duration.

In some examples, the joint segmenting and ASR model is trained to maximize a probability of emitting the end of speech segment ground truth label.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Improving the performance of end-to-end (E2E) ASR models on long utterances ranging from minutes to hours in length is an ongoing challenge in speech recognition. Streaming E2E ASR models have achieved low word error rates (WERs) for short to medium length utterances of up to a few minutes long. However, conventional E2E ASR models may have high WERs and suffer from deletion errors on long-form utterances of tens of minutes to hours long. Such utterances are found, for example, in tasks like transcribing meetings and lectures, and video captioning.

Conventionally, long-form utterances are first segmented using a separate voice activity detector (VAD). Whenever the VAD detects a long silence, it splits the audio at that location into two segments that are then processed separately or independently by an E2E ASR model. At each segment boundary, a beam search finalizes the top hypothesis by discarding all other hypotheses. This introduces more diversity into the beam search by occasionally clearing away stale hypotheses and making room for new ones, ultimately improving WER by seeing more potentially correct hypotheses. Maintaining beam diversity is particularly important for E2E ASR models, which are typically decoded with small beams. However, VAD-based segmenters suffer from high latency because a VAD, by design, must wait through long silences before deciding to segment. This delays subsequent ASR functions like rescoring or prefetching that must wait for the top hypothesis to be finalized. Improving latency is important because it can improve user experience by making smart assistants more responsive via faster prefetching, or by helping dictation or captioning apps reduce the amount of "flickering" due to switching between top hypotheses. Current VAD-based segmenters also suffer from high segmentation error because the VAD bases its decision purely on the audio and not the decoded text, which can contain semantic clues as to when to segment. Improving segmentation correctness is important because it can improve WER. On the other hand, not segmenting at all would lead to bloating the beam search with no diversity in the hypotheses, which could also induce word errors.

Figure 1:
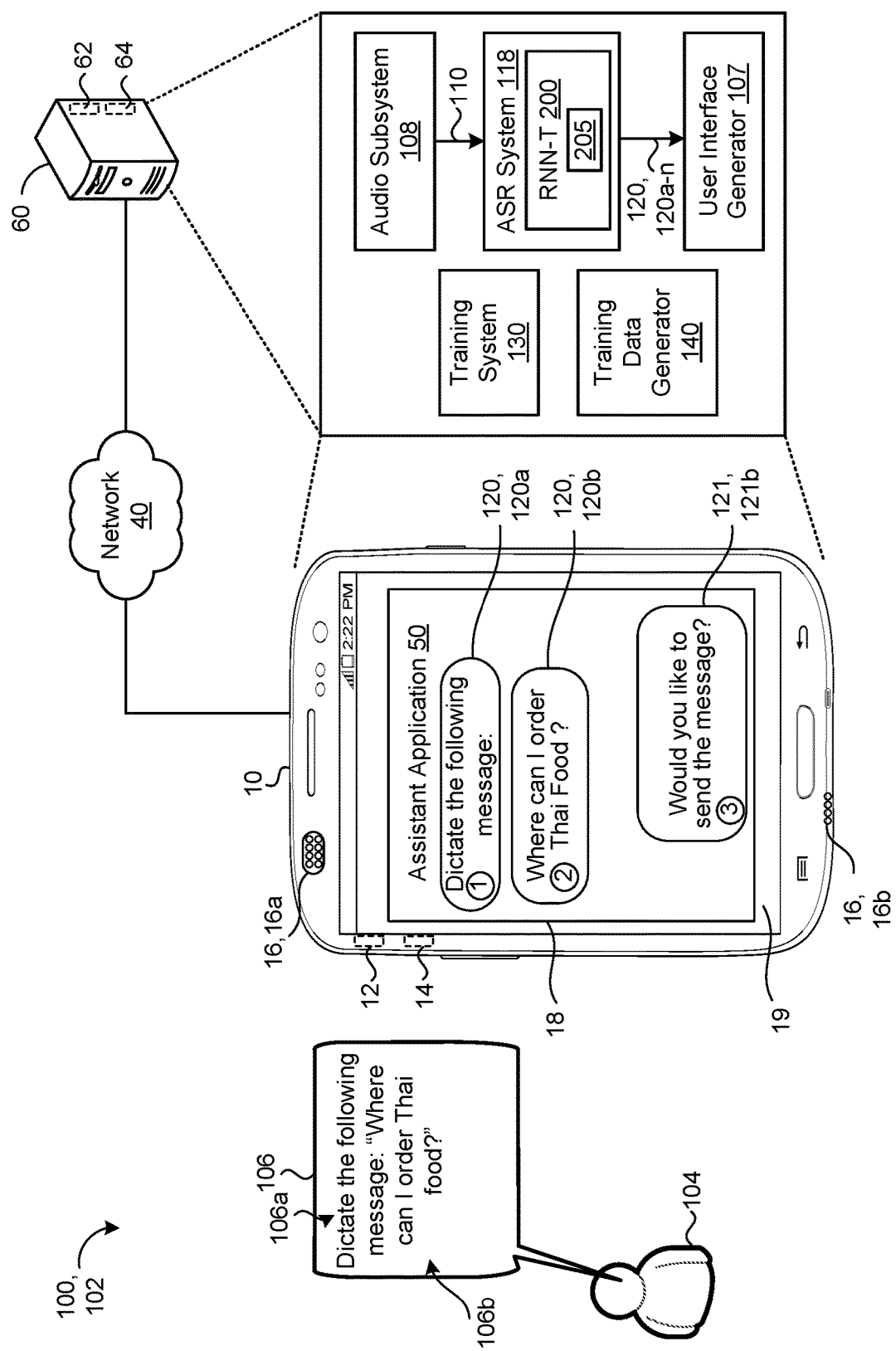
FIG. 1 is a schematic view of an example speech environment using an automatic speech recognition (ASR) system that includes an end of speech segment joint network for transcribing spoken utterances.

Implementations herein are directed toward integrating an ASR system (e.g., including a recurrent neural network-transducer (RNN-T) model) with an end of speech segment model (e.g., an additional join network) that is configured and trained to predict, based on acoustic and semantic features, whether a corresponding output step of the ASR system corresponds to an end of speech segment event. Disclosed ASR systems are jointly optimized on both end of speech segment detection and ASR tasks. However, existing long utterance training data for ASR systems typically does not include ground truth labels corresponding to end of speech segments, making supervised training of the end of speech segment joint network difficult. Implementations herein are directed toward executing an end of speech segment annotation routine for automatically inserting end of speech segment ground truth labels into ground truth training transcripts based on modeling hesitations and word timings. An example end of speech segment scheme applies a heuristic-based, weak supervision approach where end of speech segment ground truth labels are automatically inserted into the ground truth training transcripts by applying one or more rules FIG. 1 is a schematic diagram of an example system 100 and speech environment 102. In the speech environment 102, a user's 104 manner of interacting with a computing device, such as a user device 10, may be through voice input. The user device 10 (also referred to generally as a device 10) is configured to capture sounds (e.g., streaming audio data) from one or more users 104 within the speech environment 102. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications. The speech-enabled systems of the device 10 may also generate a transcription of an audible communication captured by the device 10.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, vehicle infotainment systems, internet of things (IoT) devices, vehicle infotainment systems, smart displays, smart speakers, etc. The user device 10 includes data processing hardware 12 and memory hardware 14 in communication with the data processing hardware 12. The memory hardware 14 stores instructions that, when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 102 into electrical signals, and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the system 100, an automated speech recognition (ASR) system 118 includes an RNN-T model 200 implementing an end of speech segment model 205 and residing on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the RNN-T model 200 receives, as input, the acoustic frames 110 corresponding to the utterance 106, generates indications of whether a corresponding output step corresponds to an end of speech segment that may be used to segment the utterance 106 into speech segments, and generates/predicts, as output, a corresponding transcription 120 for each speech segment of the utterance 106. In the example shown, the RNN-T model 200 may perform streaming speech recognition to produce partial transcriptions (e.g., streaming speech recognition results) 120a, 120b as the user speaks.

The user device 10 and/or the remote computing device 60 also executes a user interface generator 107 configured to present representations of the transcriptions 120, 120a-n of the utterance 106 to the user 104 of the user device 10, and to present one or more responses 121, 121a-n to queries and/or commands of the utterance 106. As described in greater detail below, the user interface generator 107 may display the speech recognition results 120, 120a-n and the responses 121, 121a-n during or at different times. As shown, the user interface generator 107 may present the speech recognition results 120, 120a-n (e.g., transcriptions) and the responses 121, 121a-n to represent an interaction/conversation between the user 104 and an interactive program or application (e.g., a digital assistant application 50).

In some configurations, the transcription 120 output from the ASR system 118 for each identified speech segment are processed, e.g., by a natural language processing/understanding (NLP/NLU) module executing on the user device 10 or the remote computing device 60, to execute a user command/query specified by the utterance 106. The digital assistant application 50 may provide an appropriate response 121 subsequent to executing the user command/query specified by the utterance 106. Additionally or alternatively, a text-to-speech system (not shown) (e.g., executing on any combination of the user device 10 or the remote computing device 60) may convert the transcription 120 and/or the response 121 into synthesized speech for audible output by the user device 10 and/or another device.

In the example shown, the user 104 interacts with a program or application (e.g., the digital assistant application 50) of the user device 10 that uses the ASR system 118. For instance, FIG. 1 depicts the user 104 communicating with the digital assistant application 50, and the digital assistant application 50 displaying an interactive digital assistant interface 18 on a screen 19 of the user device 10 to depict a natural conversational interaction between the user 104 and the digital assistant application 50. In this example, the user 104 speaks a first speech segment 106a ("Dictate the following message:") of the utterance 106, and then speaks a second speech segment 106b ("Where can I order Italian food?") of the utterance 106.

As the ASR system 118 receives the acoustic frames 110 corresponding to the utterance 106 as the user 104 speaks, the end of speech segment model 205 generates at each output step, an indication of whether the output step corresponds to an end of a speech segment. The end of speech segment indications generated by the end of speech segment model 205 may be used to delineate the speech segments 106 of the utterance 106 such that the RNN-T model 200 may perform speech recognition separately for each speech segment 106. In the example shown, the end of speech segment model 205 detects or determines an end of speech segment between the first and second speech segments 106, and outputs an end of speech segment indication indicating the end of the first speech segment 106a.

For each speech segment 106 of the utterance 106 indicated or identified by the end of speech segment model 205, the RNN-T model 200 performs speech recognition on the acoustic frames 110 corresponding to the speech segment 106 to produce speech recognition results 120 corresponding to the speech segment 106. Continuing with this example, based on the end of speech segment model 205 detecting the end of speech segment between the first and second speech segments 106, during time 1, the user interface generator 107 presents, via the digital assistant interface 18, a representation of first speech recognition results 120a for the first speech segment 106a to the user 104 of the user device 10 in a streaming fashion such that words, word pieces, and/or individual characters appear on the screen 19 of the user device 10 as soon as they are spoken.

Continuing with this example, based on the end of speech segment model 205 detecting an end of speech segment for the second speech segments 106, during time 2, the user interface generator 107 presents, via the digital assistant interface 18, a representation of second speech recognition results 120b for the second speech segment 106b to the user 104 of the user device 10 in a streaming fashion such that words, word pieces, and/or individual characters appear on the screen 19 of the user device 10 as soon as they are spoken. Then, during time 3, the user interface generator 107 presents, via the digital assistant interface 18, a response 121b (i.e., "Would you like to send the message?") generated by the assistant application 50 based on speech recognition results 120a, 120b generated for the speech segments 106a, 106b.

Figure 2:
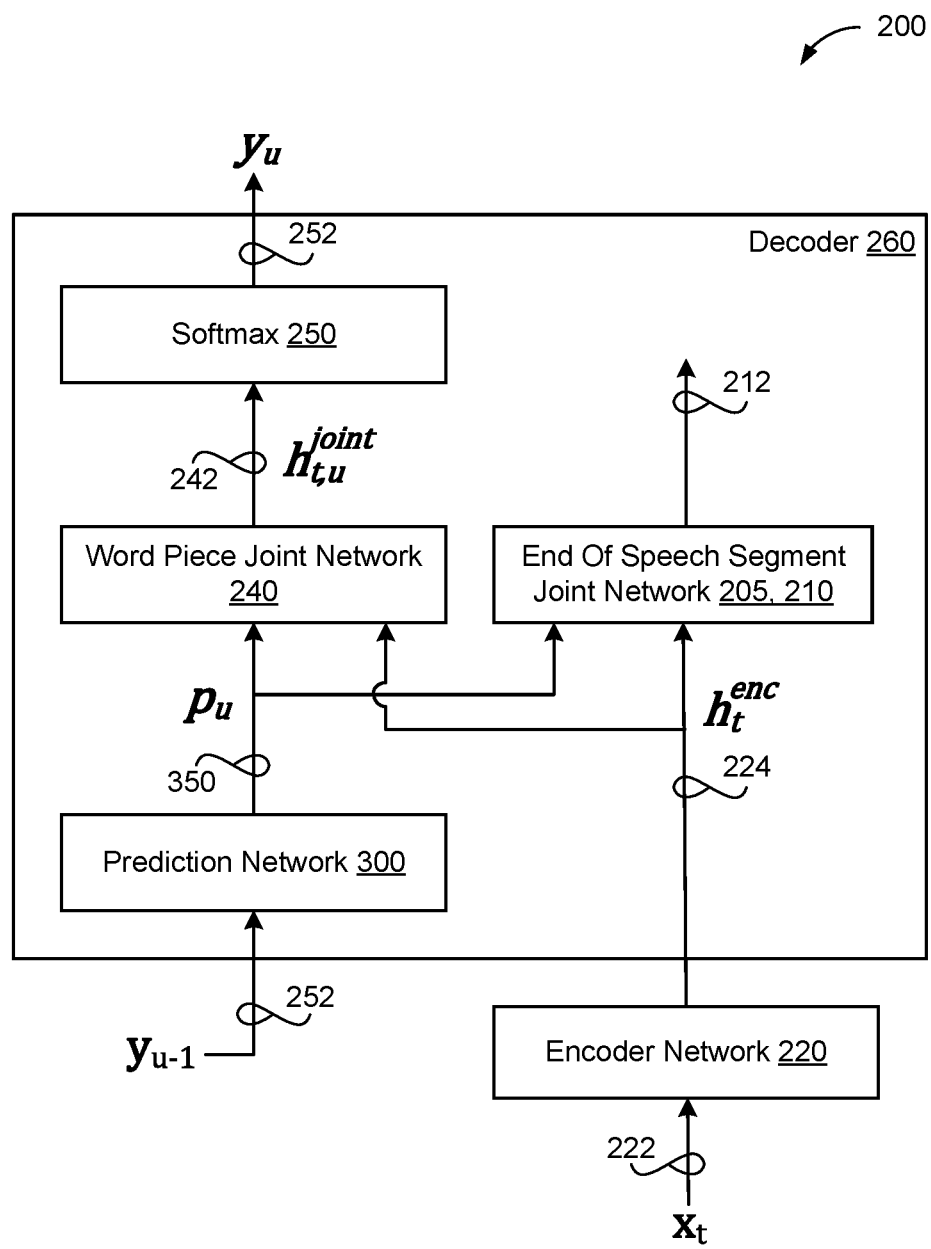
FIG. 2 is schematic views of example ASR system integrating an end of speech segment joint network.

FIG. 2 is a schematic view of an example RNN-T model 200 integrating the end of speech segment model 205 as a first joint network 210 for detecting boundaries between spoken speech segments. As shown, the RNN-T model 200 includes an encoder network 220, a prediction network 300, a second joint network 240 (i.e., a word piece joint network 240), and a final softmax output layer 250. The encoder network 220 (e.g., an audio encoder), which is roughly analogous to an acoustic model (AM) in a traditional ASR system, receives a sequence of feature vectors $x=(x_1, x_2, \ldots, x_t)$ 222, where $x_i \in \mathbb{R}_d$ (e.g., the acoustic frames 110 of FIG. 1), and produces at each output step a higher-order feature representation 224 (also generally referred to as an acoustic representation) denoted as $$h_t^{enc} = (h_1^{enc}, \ldots, h_t^{enc}).$$

In the example shown, the prediction network 300 includes an LSTM-based prediction network that, like a language model (LM), processes a sequence of non-blank symbols $y_0, \ldots, y_{u-1}$ 252 output so far by the softmax layer 250 into a hidden representation $$h_u^{pred}$$

350 (also generally referred to as a dense or linguistic representation) representing a probability distribution of whether a current output step corresponds to a pause and an end of speech segment, where $y_0$ represents a special start of sequence symbol.

Figure 3:
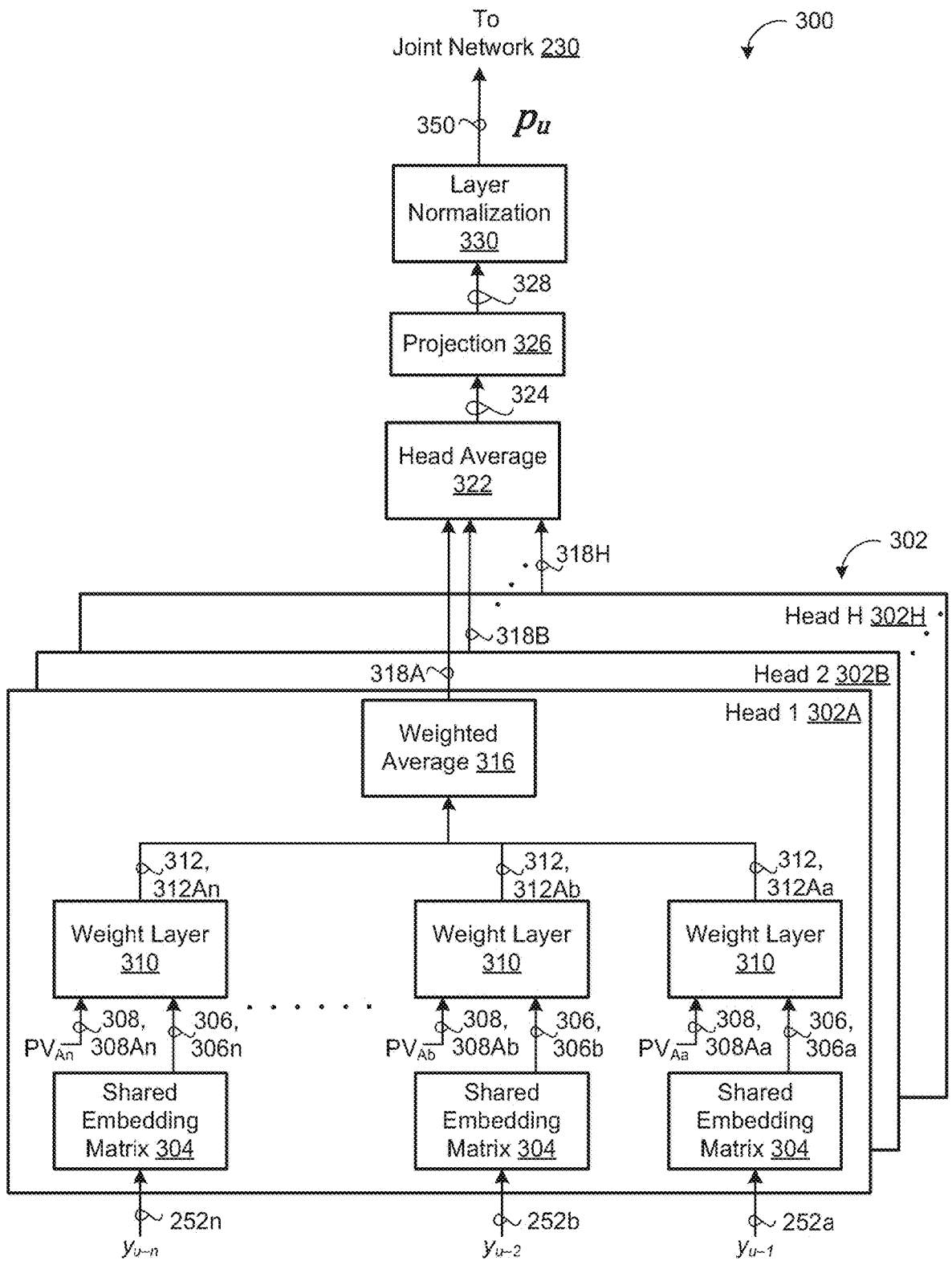
FIG. 3 is a schematic view of an example tied and reduced prediction network of the ASR system of FIG. 2.

FIG. 3 shows the prediction network 300 for the RNN-T model 200 that receives, as input, a sequence of non-blank symbols $y_{u-n}, \ldots, y_{u-1}$ that is limited to the N previous non-blank symbols 252a-n output by the final softmax layer 250. In some examples, N is equal to two. In other examples, N is equal to five, however, the disclosure is non-limiting and N may equal any integer. The sequence of non-blank symbols 252a-n may indicate a partial speech recognition result 120a, 120b (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism 302 improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 301 among the sequence of non-blank symbols $y_{ui-n}, \ldots, y_{ui-1}$ received as input at the corresponding output step from the plurality of output steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{u-n}, \ldots, y_{n-1}$. The respective position vector PV 308 assigned to each non-blank symbol indicates a position in the history of the sequence of non-blank symbols (e.g., the N previous non-blank symbols output by the final softmax layer 250). For instance, the first position vector $PV_{Aa}$ is assigned to a most recent position in the history, while the last position vector $PV_{An}$ is assigned to a last position in the history of the N previous non-blank symbols output by the final softmax layer 250. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 252$a$-$n$, $y_{u-n}, \ldots, y_{u-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302H defines another different row of position vectors $PV_{Ha-Hn}$ 308$_{Ha-Hn}$.

For each non-blank symbol in the sequence of non-blank symbols 252$a$-$n$ received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N} \sum_{h,n} X_n * \sum_e (X_{n,e} * P_{h,ne}) \quad (1)$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $P_u$ 350 (i.e., hidden representation) at the corresponding output step from the plurality of output steps. The prediction network 300 generates only a single embedding vector $P_u$ 350 at each of the plurality of output steps subsequent to an initial output step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $P_u$ 350.

Referring back to FIG. 2A, the end of speech segment joint network 210 (i.e., the first joint network 210) receives the single embedding vector $P_u$ 350 from the prediction network 300, and the higher-order feature representation $h_{t_i}^{enc}$ from the encoder 220. The end of speech segment joint network 210 generates, as output, an end of speech segment indication (e.g., an <eos> token) 212 based the conditional probability that an end of speech segment occurred. The conditional probability can be determined using the following mathematical expression:

$$P_{eos}^{joint} = P_{eos}(\langle eos \rangle | x_1 \ldots x_t, y_1, \ldots, y_u) \quad (2)$$

where $x_i$ is the $i^{th}$ audio frame, and $y_i$ is the $i^{th}$ decoded token in the beam. The end of speech segment joint network 210 emits an end of speech segment indication (e.g., an <eos> token) 212 when, for example, the conditional probability $$P_{eos}^{joint}$$

satisfies (e.g., exceeds) a predefined threshold. In some implementations, the end of speech segment joint network 210 is identical in structure to the word piece joint network 240 and contains all the same word pieces as logits. In some examples, a training system 130 (see FIG. 1) trains the encoder network 220, the prediction network 300, the word piece joint network 240, and softmax 250 during a first stage on a speech recognition task (e.g., using paired audio-transcription training data) to perform speech recognition. Paired audio-transcription training data includes audio data characterizing one or more spoken utterances and corresponding transcriptions for the spoken utterance(s). Then, during a second stage, the training system 130 initializes the end of speech segment joint network 210 with the trained weights of the word piece joint network 240 from the first stage, and fine tunes the end of speech segment joint network 210 using the ground truth end of speech segment indications (e.g., <eos> tokens) inserted into the corresponding transcription of the spoken utterance characterized by the audio data of each training sample to maximize a probability of emitting the ground truth end of speech segment indicators. In some implementations, the training system 130 trains the end of speech segment joint network 210 using a FastEmit regularization term to encourage the end of speech segment joint network 210 to emit <eos> tokens 212 as soon as sufficient context is available, which may be sooner identifying a number of consecutive non-speech acoustic frames 110 in the sequence of acoustic frames 110 that satisfy a threshold duration.

In some implementations, a training data generator 140 (see FIG. 1) automatically inserts ground truth <eos> tokens into paired audio-transcription training data (e.g., without any human annotation) using a heuristic-based, weak supervision approach where ground truth <eos> tokens are automatically inserted based on one or more rules. Example rules include, but are not limited to, inserting the ground truth end of speech segment <eos> token at the end of the corresponding transcription and inserting the ground truth end of speech segment <eos> token into the corresponding transcription at a location aligned with a non-speech segment of the audio data (e.g., silence) having a duration that satisfies a threshold duration unless the non-speech segment of the audio data follows a word in the spoken utterance that is identified as a lengthened word (e.g., "heyyy") or the non-speech segment of the audio data follows a word in the spoken utterance that is identified as a filler word (e.g., "um"). Such exceptions reflect circumstances where the speaker is likely not finished speaking a speech segment. Lengthened words may be detected when, for example, a phoneme duration satisfies a standard deviation threshold (e.g., the phoneme duration exceeds five times the phoneme duration standard deviation). Filler words may be detected using a filler word detection model. In some implementations, the training data generator 140 applies the rules and exceptions by obtaining silence, word, and phoneme timings using a forced alignment model applied to all audio-transcription pairs in a training data set.

The word piece joint network 240 (i.e., the second joint network 240) receives the single embedding vector $P_u$ 350 from the prediction network 300, and the higher-order feature representation $$h_{t_i}^{enc}$$

from the encoder 220. The word piece joint network 240 generates a probability distribution $$h_{t,u}^{joint} = P(y_i | x_{t_i}, y_0, \ldots, y_{U-1})$$

242 over possible speech recognition hypotheses at the corresponding output step. For example, when the natural language is English, the set of output labels may include twenty-seven (27) symbols, e.g., one label for each of the 26-letters in the English alphabet and one label designating a space. Accordingly, the word piece joint network 240 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the word piece joint network 240 can include a posterior probability value for each of the different output labels. Thus, when there are 100 different output labels representing different graphemes or other symbols, the output $$h_{t,u}^{joint}$$

242 of the word piece joint network 240 can include 100 different probability values, one for each output label. The probability distribution $$h_{t,u}^{joint} = P(y_i | x_{t_i}, y_0, \ldots, y_{u_i-1})$$

over the possible speech recognition hypotheses indicates a probability for a speech recognition result 120 (FIG. 1). That is, the joint network 230 determines the probability distribution for speech recognition results 120 using the single embedding vector 350 that is based on the sequence of non-blank symbols 252. Stated differently, the word piece joint network 240 generates, at each output step (e.g., output step), a probability distribution 242 over possible speech recognition hypotheses. The probability distribution $$h_{t,u}^{joint}$$

242 can then be used to select and assign scores to candidate orthographic elements (e.g., graphemes, wordpieces, and/or words) in a beam search process (e.g., by the softmax layer 240) for determining the transcriptions 120.

When the end of speech segment joint network 210 provides an indication of an end of a speech segment (e.g., an <eos> token) 212, the softmax layer 250 may employ any technique to select the output label/symbol with the highest probability in the distribution $$h_{t,u}^{joint}$$

242 as the next output symbol $y_u$ 252 predicted by the RNN-T model 200 at the corresponding output step. In this way, the RNN-T model 200 does not make a conditional independence assumption. Instead, the RNN-T model 200 predicts each symbol conditioned not only on the acoustics but also on the sequence of labels output so far. The RNN-T model 200 does assume an output symbol is independent of future acoustic frames 110, which allows the RNN-T model 200 to be employed in a streaming fashion. In some examples, the softmax layer 250 is composed of a unified word piece or grapheme set that is generated using all unique word pieces or graphemes in a plurality of training data sets.

In some implementations, the feature vectors x 222 input to the encoder network 220 may include 80-dimensional log-Mel filter bank features formed by stacking three 25 millisecond (ms) acoustic frames with a 10 ms shift, and downsampling to a 30 ms frame rate. In some examples, the encoder network 220 includes twelve 512-dimensional conformer layers. The conformer layers include causal convolution with a kernel size of 15, and a stack of left-context attention layers with 8-head self-attention. While the encoder network 220 described has a stack of multi-head attention layers/blocks with self-attention that include conformer layers/blocks (e.g., twelve conformer blocks), the present disclosure is not so limited. For instance, the encoder network 220 may include a stack of transformer layers/or a stack of any other type of multi-head attention layers/bocks. The encoder network 220 may include a series of multi-headed self-attention, depth-wise convolutional and feed-forward layers. Alternatively, the encoder network 220 may include a plurality of long-short term memory (LSTM) layers in lieu of multi-head attention layers/blocks.

The prediction network 300 may include an LTSM-based network having an embedding dimension of 320. The dimension $D^{joint}$ of the fused representation $$h_{t,u}^{joint}$$

232 may be set to 640. In some examples, the word piece joint network 240 includes hidden units. Additionally or alternatively, the word piece joint network 240 does not include a fully connected (FC) layer. Alternatively, the prediction network 300 may include a stack of transformer or conformer blocks (or other type of multi-head attention blocks). The prediction network 300 may also be an embedding look-up table (e.g., a V2 embedding look-up table) to improve latency by outputting looked-up sparse embeddings in lieu of generating hidden representations. In some implementations, the prediction network 300 is a stateless prediction network.

The end of speech segment joint network 210, the word piece joint network 240, and the prediction network 300 may collectively form an RNN-T decoder 260 of the RNN-T model 200. In some implementations, to further reduce the size of the RNN-T decoder 260, i.e., the prediction network 300 and the word piece joint network 240, parameter tying between the prediction network 300 and the word piece joint network 240 is applied. Specifically, for a vocabulary size $|V|$ and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 240, feed-forward projection weights from the hidden layer to the output logits will be $W \in \mathbb{R}^{d_h \times |V|+1|}$, with an extra blank token in the vocabulary. Accordingly, the feed-forward layer corresponding to the last layer of the word piece joint network 240 includes a weight matrix $[d_h, |V|]$. By having the prediction network 300 to tie the size of the embedding dimension $d_e$ to the dimensionality $d_h$ of the last hidden layer of the word piece joint network 240, the feed-forward projection weights of the word piece joint network 240 and the shared embedding matrix 304 of the prediction network 300 can share their weights for all non-blank symbols via a simple transpose transformation. Since the two matrices share all their values, the RNN-T decoder 260 only needs to store the values once in memory, instead of storing two individual matrices. By setting the size of the embedding dimension $d_e$ equal to the size of the hidden layer dimension $d_h$, the RNN-T decoder 260 reduces a number of parameters equal to the product of the embedding dimension $d_e$ and the vocabulary size $|V|$. This weight tying corresponds to a regularization technique.

In some implementations, the RNN-T model 200 performs a frame-synchronous beam search with a beam size of 8 and a pruning threshold of five (i.e., partial hypotheses with negative log posterior exceeding that of the top hypothesis by 5 are removed). At each frame, the RNN-T model 200 performs a breadth-first search for possible expansions, ignoring any expansion with a negative log posterior of five or greater, and limits the search depth to ten expansions. In some examples, the RNN-T model 200 forces the end of a speech segment that exceeds a duration of sixty-five seconds.

Figure 4:
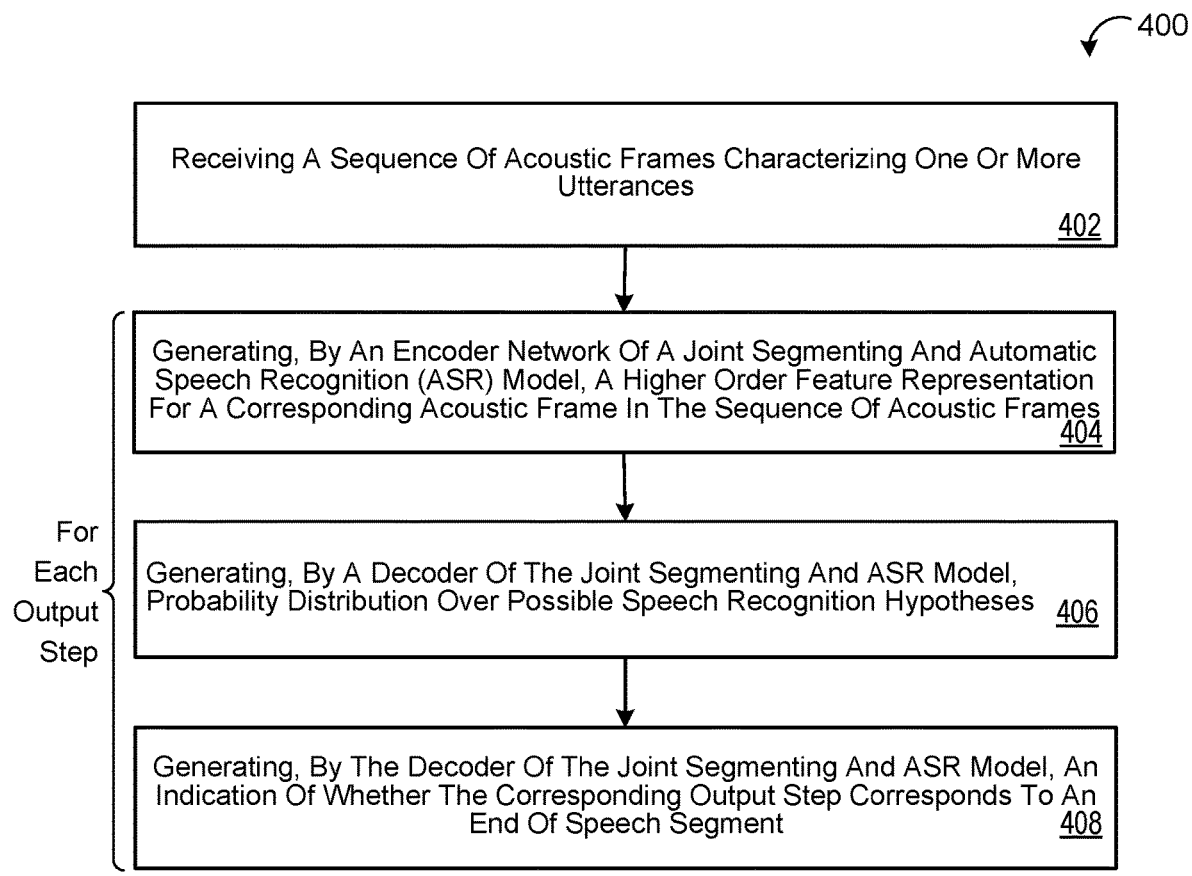
FIG. 4 is a flowchart of an example arrangement of operations for a computer-implemented method of executing an ASR system including an end of speech segment model.

FIG. 4 is a flowchart of an exemplary arrangement of operations for a computer-implemented method 400 for performing joint segmenting and automated speech recognition. At operation 402, the method 400 includes receiving a sequence of acoustic frames (e.g., the feature vectors $x=(x_1, x_2, \ldots, x_t)$ 110, 222) characterizing one or more utterances (e.g., the utterance 106).

At each of a plurality of output steps, the method 400 performs operations 404, 406, and 408. At operation 404, the method 400 includes generating, for each of a plurality of output steps, by an encoder network 220 of a joint segmenting and automatic speech recognition (ASR) model (e.g., the RNN-T 200), a higher order feature representation $$h_t^{enc}$$

224 for a corresponding acoustic frame in the sequence of acoustic frames.

At operation 406, the method 400 includes generating, by a decoder 260 of the joint segmenting and ASR model, a probability distribution $$h_{t,u}^{joint}.$$

242 over possible speech recognition hypotheses. At operation 408, the method 400 includes generating, by the decoder 260 of the joint segmenting and ASR model, an indication of whether the corresponding output step corresponds to an end of speech segment. Here, the joint segmenting and ASR model 200 is trained on a set of training samples each including: audio data characterizing a spoken utterance, and a corresponding transcription of the spoken utterance, the corresponding transcription having an end of speech segment ground truth token inserted into the corresponding transcription automatically based on a set of heuristic-based rules and exceptions applied to the training sample.

Figure 5:
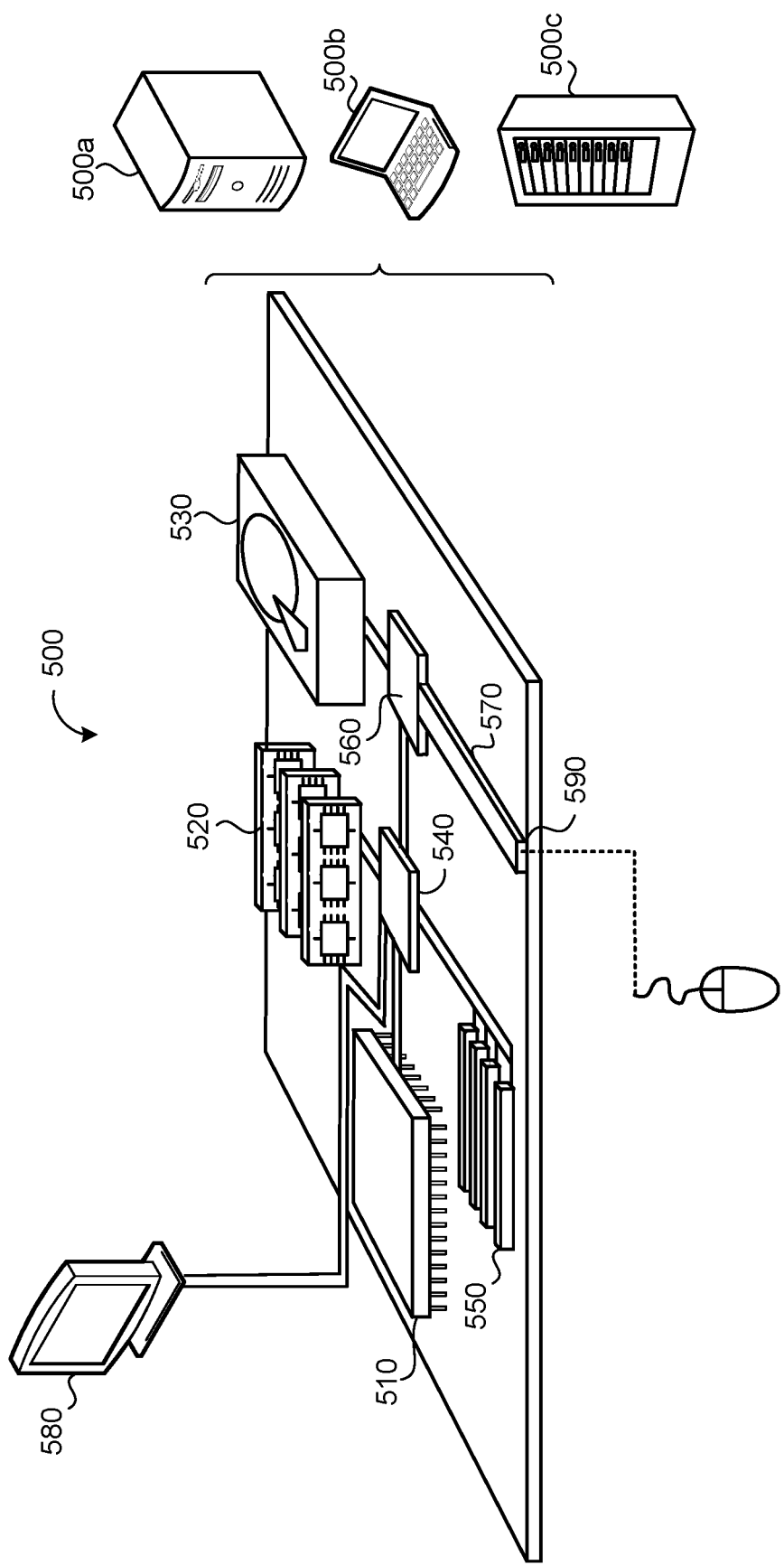
FIG. 5 is a schematic view of an example computing device that may be used to implement the systems and methods described herein.

FIG. 5 is schematic view of an example computing device 500 that can be used to implement the systems and methods described in this document. The computing device 500 is intended to represent various forms of digital computers, such as laptops, desktops, workstations, personal digital assistants, servers, blade servers, mainframes, and other appropriate computer devices. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 12 and/or 62, memory 520 (i.e., memory hardware) that can be used to implement the memory hardware 14 and/or 64, a storage device 530 (i.e., memory hardware) that can be used to implement the memory hardware 14 and/or 64, a high-speed interface/ controller 540 connecting to the memory 520 and high-speed expansion ports 550, and a low speed interface/ controller 570 connecting to a low speed bus 560 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 570 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 570 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array), a graphics processing unit (GPU), a tensor processing unit (TPU), or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A joint segmenting and automated speech recognition (ASR) model comprising:
an encoder configured to:
receive, as input, a sequence of acoustic frames characterizing one or more utterances; and
generate, at each of a plurality of output steps, a higher order feature representation for a corresponding acoustic frame in the sequence of acoustic frames; and
a decoder configured to:
receive, as input, the higher order feature representation generated by the encoder at each of the plurality of output steps; and
generate, at each of the plurality of output steps:
a probability distribution over possible speech recognition hypotheses; and
an indication of whether the corresponding output step corresponds to an end of speech segment,
wherein the joint segmenting and ASR model is trained on a set of training samples, each training sample in the set of training samples comprising:
audio data characterizing a spoken utterance; and
a corresponding transcription of the spoken utterance, the corresponding transcription having an end of speech segment ground truth token inserted into the corresponding transcription automatically based on a set of heuristic-based rules and exceptions applied to the training sample, and
wherein the decoder comprises:
a prediction network configured to, at each of the plurality of output steps:
receive, as input, a sequence of non-blank symbols output by a final softmax layer; and
generate a hidden representation;
a first joint network configured to:
receive, as input, the hidden representation generated by the prediction network at each of the plurality of output steps and the higher order feature representation generated by the encoder at each of the plurality of output steps; and
generate, at each of the plurality of output steps, the indication of whether the corresponding output step corresponds to the end of speech segment;
a second joint network configured to:
receive, as input, the hidden representation generated by the prediction network at each of the plurality of output steps and the higher order feature representation generated by the encoder at each of the plurality of output steps; and
generate, at each of the plurality of output steps, independently of the indication of whether the corresponding output step corresponds to the end of speech segment generated by the first joint network, the probability distribution over possible speech recognition hypotheses; and
the final softmax layer configured to, when the first joint network generates the indication that the corresponding output step corresponds to the end of speech segment, select an output symbol with a highest probability in the probability distribution over possible speech recognition hypotheses as a next non-blank output symbol in the sequence of non-blank output symbols at the corresponding output step.

2. The joint segmenting and ASR model of claim 1, wherein, at each of the plurality of output steps:
the sequence of previous non-blank symbols received as input at the prediction network comprises a sequence of N previous non-blank symbols output by the final softmax layer; and
the prediction network is configured to generate the hidden representation by:
for each non-blank symbol of the sequence of N previous non-blank symbols, generating a respective embedding; and generating an average embedding by averaging the respective embeddings, the average embedding comprising the hidden representation.

3. The joint segmenting and ASR model of claim 1, wherein the prediction network comprises a V2 embedding look-up table.

4. The joint segmenting and ASR model of claim 1, wherein a training process trains the joint segmenting and ASR model on the set of training samples by:
training, during a first stage, the second joint network to learn how to predict the corresponding transcription of the spoken utterance characterized by the audio data of each training sample; and
after training the second joint network, during a second stage:
initializing, the first joint network with the same parameters as the trained second joint network; and
using the end of speech segment ground truth token inserted into the corresponding transcription of the spoken utterance characterized by the audio data of each training sample.

5. The joint segmenting and ASR model of claim 1, wherein the encoder comprises a causal encoder comprising a stack of conformer layers or transformer layers.

6. The joint segmenting and ASR model of claim 1, wherein the end of speech segment ground truth token is inserted into the corresponding transcription automatically without any human annotation.

7. The joint segmenting and ASR model of claim 1, wherein the set of heuristic-based rules and exceptions applied to each training sample in the set of training samples comprises:
inserting the end of speech segment ground truth token at the end of the corresponding transcription; and
inserting the end of speech segment ground truth token into the corresponding transcription at a location aligned with a non-speech segment of the audio data having a duration that satisfies a threshold duration unless:
the non-speech segment of the audio data follows a word in the spoken utterance that is identified as a lengthened word; or
the non-speech segment of the audio data follows a word in the spoken utterance that is identified as a filler word.

8. The joint segmenting and ASR model of claim 7, wherein the word in the spoken utterance is identified as the lengthened word when a phoneme duration of the word satisfies a standard deviation threshold.

9. The joint segmenting and ASR model of claim 7, wherein, after training the joint segmenting and ASR model, the decoder is configured to emit the indication that the corresponding output step corresponds to the end of speech segment sooner than identifying a number of consecutive non-speech acoustic frames in the sequence of acoustic frames that satisfy the threshold duration.

10. The joint segmenting and ASR model of claim 1, wherein the joint segmenting and ASR model is trained to maximize a probability of emitting the end of speech segment ground truth label.

11. A computer-implemented method executed on data processing hardware that causes the data processing hardware to perform operations comprising:
receiving a sequence of acoustic frames characterizing one or more utterances; and
at each of a plurality of output steps:
generating, by an encoder of a joint segmenting and automated speech recognition (ASR) model, a higher order feature representation for a corresponding acoustic frame in the sequence of acoustic frames;
generating, using a prediction network of a decoder of the joint segmenting and ASR model, a hidden representation based on a sequence of non-blank symbols output by a final softmax layer; and
generating, by the decoder of the joint segmenting and ASR model:
a probability distribution over possible speech recognition hypotheses; and
an indication of whether the corresponding output step corresponds to an end of speech segment,
wherein the joint segmenting and ASR model is trained on a set of training samples, each training sample in the set of training samples comprising:
audio data characterizing a spoken utterance; and
a corresponding transcription of the spoken utterance, the corresponding transcription having an end of speech segment ground truth token inserted into the corresponding transcription automatically based on a set of heuristic-based rules and exceptions applied to the training sample,
wherein generating the indication of whether the corresponding output step corresponds to the end of speech segment comprises generating, using a first joint network of the decoder, the indication of whether the corresponding output step corresponds to the end of speech segment based on the hidden representation generated by the prediction network at each of the plurality of output steps and the higher order feature representation generated by the encoder at each of the plurality of output steps,
wherein generating the probability distribution over possible speech recognition hypotheses comprises generating, using a second joint network of the decoder, independently of the indication of whether the corresponding output step corresponds to the end of speech segment generated using the first joint network, the probability distribution over possible speech recognition hypothesis based on the hidden representation generated by the prediction network at each of the plurality of output steps and the higher order feature representation generated by the encoder at each of the plurality of output steps, and
wherein the final softmax layer is configured to, when the first joint network generates the indication that the corresponding output step corresponds to the end of speech segment, select an output symbol with a highest probability in the probability distribution over possible speech recognition hypotheses as a next non-blank output symbol in the sequence of non-blank output symbols at the corresponding output step.

12. The computer-implemented method of claim 11, wherein:
the sequence of previous non-blank symbols received as input at the prediction network comprises a sequence of N previous non-blank symbols output by the final softmax layer; and
generating the hidden representation using the prediction network comprises generating the hidden representation by:
for each non-blank symbol of the sequence of N previous non-blank symbols, generating a respective embedding; and generating an average embedding by averaging the respective embeddings, the average embedding comprising the hidden representation.

13. The computer-implemented method of claim 11, wherein the prediction network comprises a V2 embedding look-up table.

14. The computer-implemented method of claim 11, wherein a training process trains the joint segmenting and ASR model on the set of training samples by:
training, during a first stage, the second joint network to learn how to predict the corresponding transcription of the spoken utterance characterized by the audio data of each training sample; and
after training the second joint network, during a second stage:
initializing, the first joint network with the same parameters as the trained second joint network; and
using the end of speech segment ground truth token inserted into the corresponding transcription of the spoken utterance characterized by the audio data of each training sample.

15. The computer-implemented method of claim 11, wherein the encoder comprises a causal encoder comprising a stack of conformer layers or transformer layers.

16. The computer-implemented method of claim 11, wherein the end of speech segment ground truth token is inserted into the corresponding transcription automatically without any human annotation.

17. The computer-implemented method of claim 11, wherein the set of heuristic-based rules and exceptions applied to each training sample in the set of training samples comprises:
inserting the end of speech segment ground truth token at the end of the corresponding transcription; and
inserting the end of speech segment ground truth token into the corresponding transcription at a location aligned with a non-speech segment of the audio data having a duration that satisfies a threshold duration unless:
the non-speech segment of the audio data follows a word in the spoken utterance that is identified as a lengthened word; or
the non-speech segment of the audio data follows a word in the spoken utterance that is identified as a filler word.

18. The computer-implemented method of claim 17, wherein the word in the spoken utterance is identified as the lengthened word when a phoneme duration of the word satisfies a standard deviation threshold.

19. The computer-implemented method of claim 17, wherein, after training the joint segmenting and ASR model, the operations further comprise emitting, by the decoder, the indication that the corresponding output step corresponds to the end of speech segment sooner than identifying a number of consecutive non-speech acoustic frames in the sequence of acoustic frames that satisfy the threshold duration.

20. The computer-implemented method of claim 11, wherein the joint segmenting and ASR model is trained to maximize a probability of emitting the end of speech segment ground truth label.

* * * * *